INVENTOR.
Bertram M. Harrison
BY
his ATTORNEY

Aug. 5, 1947.  B. M. HARRISON  2,424,981
SIGNALING SYSTEM
Filed Feb. 27, 1943  5 Sheets-Sheet 2

INVENTOR.
Bertram M. Harrison
BY
*Ezekiel Wolf*
his ATTORNEY

Aug. 5, 1947.  B. M. HARRISON  2,424,981
SIGNALING SYSTEM
Filed Feb. 27, 1943  5 Sheets-Sheet 3

INVENTOR
Bertram M. Harrison
BY
ATTORNEY

INVENTOR.
BERTRAM M. HARRISON

Patented Aug. 5, 1947

2,424,981

UNITED STATES PATENT OFFICE 2,424,981

SIGNALING SYSTEM

Bertram M. Harrison, Wellesley Hills, Mass., assignor, by mesne assignments, to Submarine Signal Company, Boston, Mass., a corporation of Delaware Application February 27, 1943, Serial No. 477,477

9 Claims. (Cl. 161—15)

The present invention relates to apparatus for distance measurement by the use of the time-of-travel method by measuring the time interval it takes for the energy sent out from a given point to reach the object and be reflected to a point at which the receiving apparatus is located. The present invention more particularly is concerned with an indicator for such apparatus by which accurate measurements may be made with the use of equipment which is comparatively simple to construct and reliable in its operation.

In apparatus for distance ranging and depth measurement it is extremely useful to have accurate measurements wherever possible. In sound ranging equipment it is extremely useful to provide accuracy over the entire operating range while in depth sounding equipment accuracy is desired more particularly for shallow depths. It has been the practice in the prior art to use both long-range and short-range scales which usually are controlled and operated through a plurality of indicators operating at different speeds. One of the purposes of the present invention is to provide both long-range and short-range scales operating without any change or shift in the mechanism of the indicator and without the use of a plurality of indicators or a dual system.

Other features and advantages of the present invention will be more readily understood from the specification below taken in connection with the drawings showing an embodiment of the invention in which Fig. 1 is an elevation partly in section illustrating the invention;

Figures 1, 2:
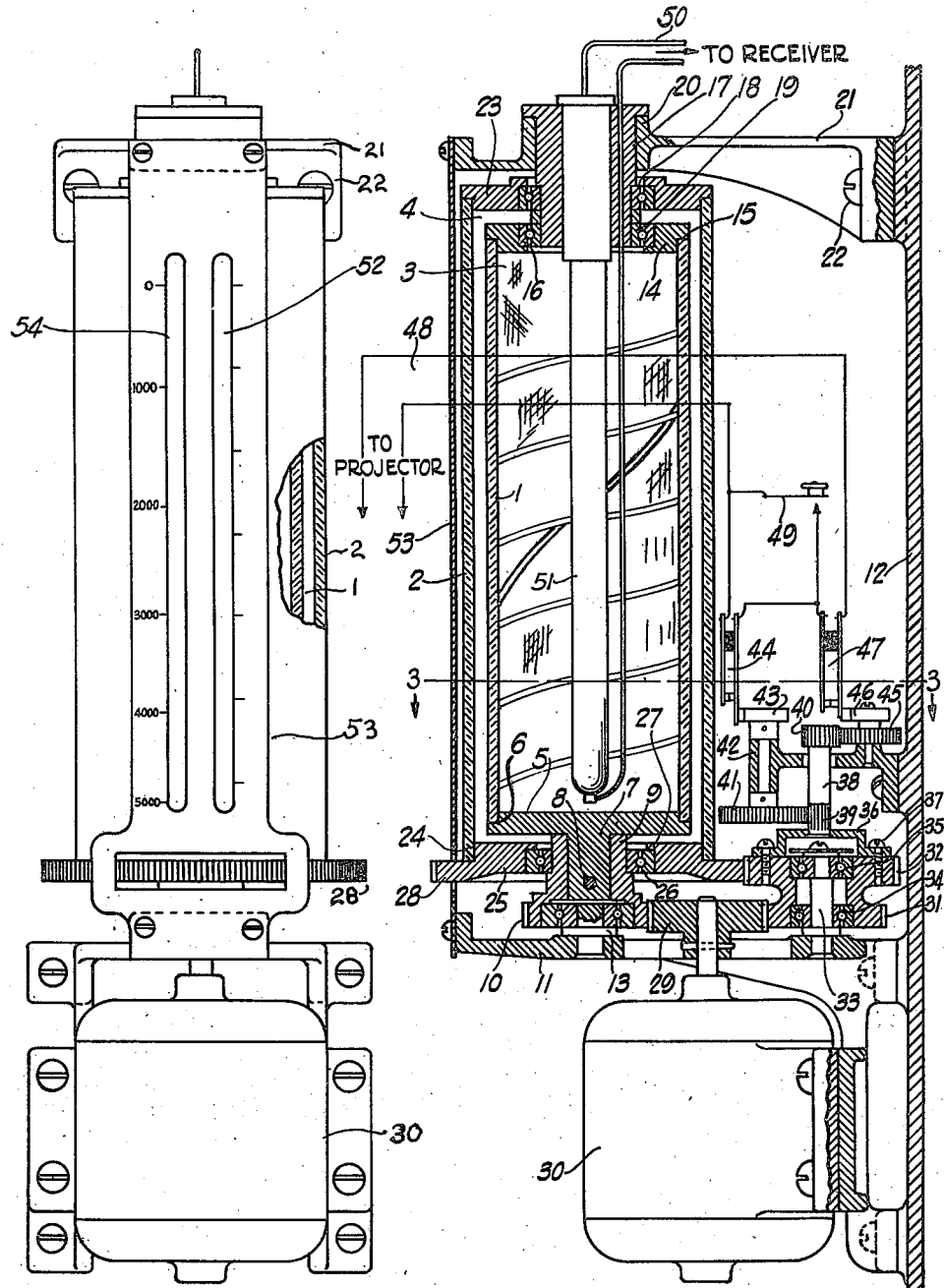
Fig. 2 is an elevation showing a small fragmentary section viewed from the left of Fig. 1.

The present invention in general employs two concentric cylinders 1 and 2 which are opaque except for a visible slit on each cylinder which spirals from one end of the cylinder to the other in a fashion as will be described later in the specification. These cylinders are rotated in opposite directions and the intersections of the spiral form a window through which a light operated by the received signal flashes to indicate by the position of the window at the moment of the flash the interval or distance being measured. In accordance with this general outline as described, the present apparatus is provided with an inner cylinder 1 and an outer cylinder 2. These cylinders may be made of glass, Lucite or other suitable transparent material and are provided with opaque coatings 3 and 4 except for the spiral slits running around the cylinders. The cylinder 1 may be mounted on a base member 5 against a shoulder 6 at the edge of the base member. Projecting from the base member 5 at the bottom is a shaft 7 which is pinned by the pin 8 in a sleeve 9 which is free to be rotated by the gear 10. A supporting bracket 11 attached to the wall 12 of the casing has a thrust bearing 13 on which the shaft 7 and sleeve 9 and the gear 10 may be rotated about a vertical axis as viewed in Fig. 1. The cylinder 1 at the top is supported in a shoulder 15 of a flange plate 14 which has a ball-bearing ring 16 concentrically positioned with respect to the cylinder 1 and provides a bearing for the cylinder with respect to the sleeve or hollow shaft 17. The outer cylinder 2 is similarly provided with an end flange 23 and a ball bearing ring 18 permitting free rotation of cylinder 2. The bearing shaft 17 is inserted through a collar 20 which is supported by the bracket 21 attached to the wall 12 of the casing by means of the screws 22 or in some other suitable manner. The cylinder 2 at its lower end rests in a shoulder 24 of the flange plate 25 which has an axial cylindrical hole supporting a ball bearing ring 26, which ball-bearing ring at its inner side rests against the sleeve 9.

The supporting bracket 11 and the support 13 furnish a vertical thrust bearing for the outer cylinder 2 and its flange plate 25 since the ball-bearing ring 26 rests upon a shoulder of the sleeve 9 and itself supports the flange 25 by means of the inner shoulder 27 at the edge of the axial opening in the flange 25. The flange 25 is provided with a ring gear member 28 by which the cylinder 2 is driven. The cylinder 1 is driven by the gear 10 which meshes with the gear 29 which is driven by the motor 30 supported by the wall 12. The gear 29 also drives, through the gears 31 and 32 carried on the same vertical shaft 33 supported in the bracket 11 and rotating in the ball-bearing rings 34 and 35, the gear 28 in a direction opposite to that from the gear 10. It will also be noted that the cylinder 2 in this arrangement is driven at a slower speed than the cylinder 1, the gear ratio being such to give the desired difference in speeds, as will be further explained in the specification below.

Mounted to rotate with the gear 32 is a bracket 36 attached to the gear face by means of the screws 37. This bracket 36 supports a shaft 38 which is firmly pinned to the bracket so that this shaft rotates with it. The shaft 38 is provided with two gear wheels 39 and 40. The gear 39 meshes with a second larger gear 41 which drives through the shaft 42, a switch cam 43 closing once every revolution a pair of contacts 44 in the transmitting or keying circuit.

The gear 40 drives a second gear 45 which also carries a cam 46 operating once every revolution, a pair of contact switches 47 in the transmitting or keying circuit. The two switches 44 and 47 are in series with the projector line 48 which transmits or controls the instant of emission of the signal wave. A short circuit contact 49 is provided across the keying switch 44 so that this may be cut out, if desired, for the purpose of providing a vernier scale operation, as will be more fully described later. It will be noted that the shaft 38 operates at the same R. P. M. as the inner cylinder 1 and also at the same speed as the motor 30 if a 1:1 gear ratio is maintained between the gears 10, 29 and 31, respectively. Therefore by maintaining the same gear ratio between the gears 40 and 45 as between the gears 32 and 28, the cam 46 will be synchronized with the outer cylinder 2. In this manner the contacts 47 will be closed once in every revolution of the cylinder 2 at the same relative position of the cylinder.

The cam 43, on the other hand, is rotated at a slower velocity than the velocity of the cylinder 2 in such a relation that the contacts 44 are closed every nth revolution of the cylinder 2, the number n being more fully explained below.

In the circuit arrangement of the system a sounding may be made once every revolution of the cylinder 2 by closing the keying switch 49. In this case the contact 44 is cut out of the circuit and since the cam 46 rotates in synchronism with the cylinder 2, a signal wave will be projected at the proper position of the cylinder corresponding to the position of the cam. This signal wave, after being reflected from the object whose distance is to be measured, is picked up over the receiver lines 50 and made to operate a flashing indicator 51 which may be of the neon tube type and which is positioned at the axis of the cylinder, the indicator showing through the intersection of the spirals as viewed through the slit 52 in the plate 53. The plate 53 is provided with two slits, one numbered 52, already mentioned, and the other numbered 54. Since the spirals may intersect in a number of places, the slits are necessary to eliminate all but the desired points of intersection, as will be more fully explained in connection with the other figures. In this connection the light showing through one slit 52 may give the shallow depth or short distance indications while the light showing through the slit 54 may provide the deep indications or, if desired, one scale, for instance 52, may be a vernier scale. This will more fully appear from the discussion and description in connection with Figs. 4, 5, 6, 7 and 8.

Figure 7:
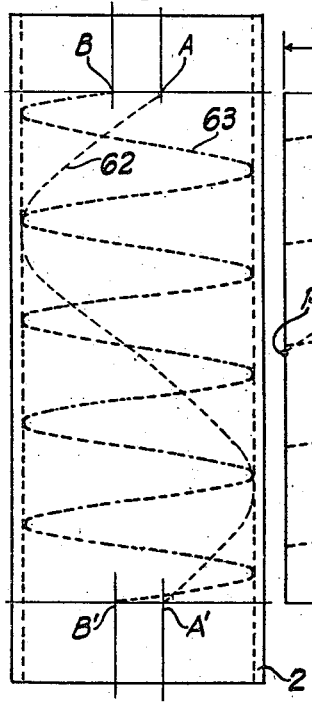
Fig. 7 shows a a detail of the element of Fig. 4 with curves representing transparent windows which curves are obtained from the layout of Fig. 8.
Figure 8:
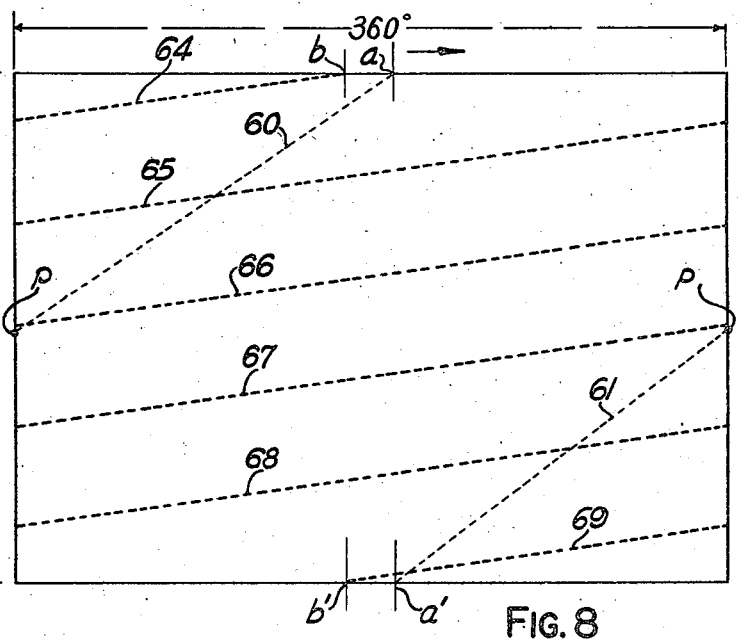
Fig. 8 shows a development of the surface of Fig. 7.

Considering first Fig. 8, this shows the development of the outer cylinder 2. The dotted lines 60 and 61 are the development of a single turn spiral indicated by the spiral line 62 on the cylinder 2 of Fig. 7. The point P at the right in Fig. 8 corresponds to the point P at the left in Fig. 8, since the two side edges meet when the flat sheet is formed into a cylinder. In one revolution, therefore, of the cylinder 2 the intersection of the straight line from A to A' with the spiral 62 of Fig. 7 will travel longitudinally down the length of the cylinder from the top point A to the bottom point A', making one complete cycle beginning with the point a and ending with the point a' as viewed in Fig. 8. The straight line A—A' may be made to coincide with the window slit 52 by means of which the indication would be fixed and visible with reference to the indicating scale.

On the same cylinder 2 there may be provided a second spiral curve 63 which is shown in development by the lines 64, 65, 66, 67, 68 and 69. This makes five complete wraps about the cylinder. Its end points do not coincide with those of spiral 62. They are indicated at B and B' on Fig. 7 and at b and b' on Fig. 8. As the cylinder rotates the ends of spiral 63 trail the ends of spiral 62 by the circumferential distance AB, Fig. 7, which corresponds to the distance separating the slits 52 and 54 in the plate 53. The spiral 63 intersects the slit 54 in five points, as can be seen by laying a straight-edge vertically upon Figure 8. However, when cylinders 1 and 2 are assembled as shown in Fig. 1, and both are driven at the proper relative speeds, four of these in intersections are masked by the cylinder 1, i. e. only one of the five intersections of spiral 63 with slit 54 is superposed on a cooperating spiral 77 on cylinder 1 at any instant.

The outer cylinder 2 has, for example, been shown with two spirals 62 having one convolution and 63 having five convolutions which means that the ratio of the measuring scale is 1 to 5 with respect to the window opening 52 or 54.

Figure 5:
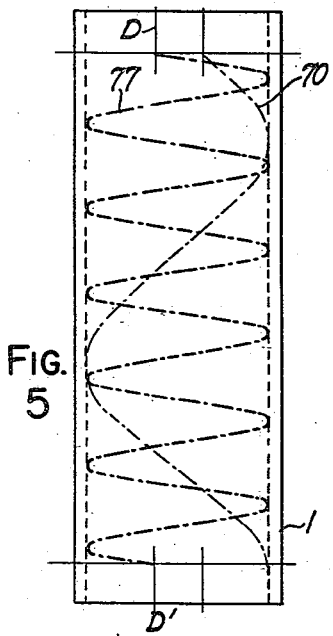
Fig. 5 shows an element of Fig. 4 with curves representing transparent windows which curves are obtained from the layout of Fig. 6.
Figure 6:
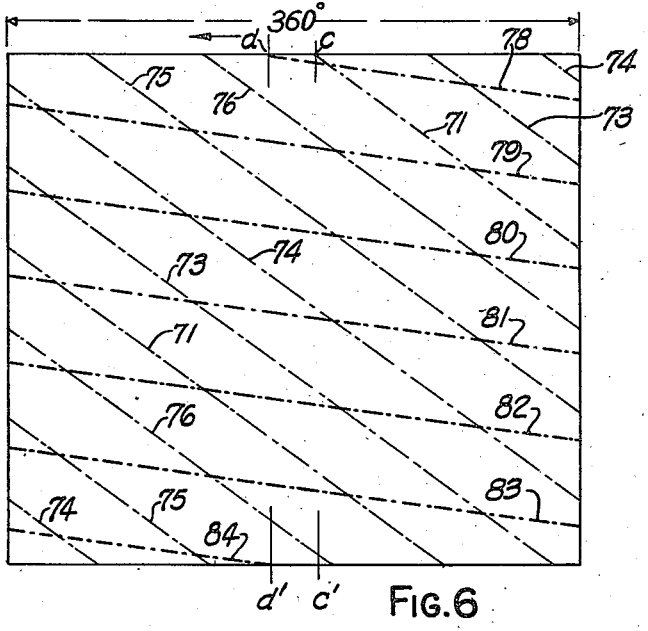
Fig. 6 shows a development of the surface of Fig. 5.

The inner cylinder 1 shown in Fig. 5 has, for the sake of example, been provided with spirals 70 of 1.2 convolutions and a second spiral 77 of 6 convolutions. In the development in Fig. 6 the line 71 corresponds to the spiral 70 of Fig. 5. In addition other similar spirals are shown on the layout identified by lines 73, 74, 75 and 76. Similarly corresponding to the spiral 77 of Fig. 5 its development is shown in Fig. 6 by the lines 78, 79, 80, 81, 82, 83 and 84.

When the cylinders are assembled as indicated in Fig. 1 and are rotated in opposite directions, the intersection of the properly associated spirals will travel along a straight line coinciding with the desired window opening 52 or 54. It will be understood in considering the spirals on windows 1 and 2 that only those which are intended to cooperate to form the desired point of intersection need be used.

Consider in the first instance the association of the spiral 70 on cylinder 1 with the spiral 62 on cylinder 2. The intersection of these two spirals will take place in a straight line corresponding to the window opening 52. Since, however, the cylinder 2 will make a single revolution while the cylinder 1 will make 1.2 revolutions, because of the gearing between cylinders, on the second revolution of the cylinder 2 the spiral 70 will have advanced to a position different from that of the starting point C. In the additional family of spirals shown in Fig. 6, which is also applied to Fig. 5 (but not shown), the spiral corresponding to the line 73 will be at the starting point C and on subsequent revolutions the spirals corresponding to the lines 74, 75 and 76 will each be at the starting point so that, in effect, a complete cycle will be made for six revolutions of the cylinder 1 or five revolutions of the cylinder 2 with the intersections occurring along the line corresponding to A—A' in Fig. 7 which corresponds to the indicator window opening 52 of Fig. 2. This intersection of spirals corresponding to 70 on cylinder 1 and 62 on cylinder 2 will produce a relatively long length of scale in compact form which covers five times the unit scale length of the window opening 52.

The second group of spirals, namely the spiral 77 of cylinder 1 and 63 of cylinder 2 may be used to produce an indication which would appear as an intersection traveling down the length of the window 54 corresponding to the lines D—D', Fig. 5, and B—B' on Fig. 7. This intersection will travel downward behind the window opening 54 once in every five revolutions of the slower cylinder 2 or once in every six revolutions of the faster moving cylinder 1.

For the proper chosen speed of rotation of cylinder 2 the calibration of the scale will be determined depending upon the following formula:

$$F = \frac{nv}{2d}$$

where F is the number of revolutions of the cylinder per unit time, n equals the number of convolutions of the spiral, v equals the velocity of the propagating wave in the medium and 2d equals the total distance of travel of the wave starting with a measuring point corresponding to the moment when the indicator was at a zero position. In the case of the measurement of distances or depth where the signal is transmitted from the point where the indicator is located or in its immediate vicinity, d equals the distance of the reflecting object.

In the arrangement, therefore, shown in Figs. 5, 6, 7 and 8 the scale at the right is in effect five times as large as the scale at the left and if the entire measuring distances were 5000 feet, then in the first 1000 feet the indicator in the right window would travel the length of the scale while the indicator in the left window would travel one-fifth of the scale. In the second thousand feet the indicator at the right would again travel the whole scale while that at the left would go between the 1000 mark and the 2000 mark.

The keying arrangement should now be quite obvious from the description of the operation of the scale. When shallow distances are to be measured or rather when a short scale is to be used, a signal for every revolution of the cylinder 2 will produce by the combination of the single spiral 62 of the cylinder 2 and the family of spirals of cylinder 1 signal impulses at the beginning of the travel of the indicator down the scale length.

Referring to Figs. 6 and 8, the first indication will begin with the intersection of the lines 60 and 71 for the first revolution while for succeeding revolutions the indications will begin with the intersection of the line 60 with the lines 73, 74, 75 and 76, respectively. In the window 54 to the left of the window 52 the intersection of the spirals 63 and 77 will be visible and this intersection will begin referring to the development of Figs. 6 and 8 with the intersection of the lines 64 and 78 at the top of the scale at the instant that the key 49 is closed. The intersection of the two spirals at the top of the scale, however, will occur only once in every five revolutions of the slowest spiral. For this purpose the contacts 44 are placed in series with the contacts 47 so that the projector circuit may remain open until every fifth revolution of the slower cylinder 2. Therefore, the operation of this system will be as follows, assuming that the system is being operated for deep depths.

The key 49 will be left open, the cam 43 will travel at one-fifth of the rotational velocity of the cam 46 and allow a signal to be produced by the projector once in every fifth revolution of the cam 43. The cam 46 is synchronized with the cylinder 2 and with the cam 43 in such a position so that both cams 43 and 46 close switches 44 and 47 and produce a signal at the instant that the spiral curves 63 and 77 intersect in front of the scale window 54 which is the zero point of the scale. At this same instant the spiral 70 intersects with the spiral 62 at the zero point of the scale in front of the scale window 52. The signal is emitted and after reflection from the object whose distance is to be measured is received by the receiver over the receiving line 50 and made to operate the indicator 51. If this should be within the first revolution of the cylinder 2, an indication will show by the intersection of the spirals 70 and 62 somewhere along the window 52. A corresponding indication will also show in the first fifth section of the window 54. If the signal returns in the second revolution of the cylinder 2, the intersection will ocur with a spiral corresponding to that of the line 73 in the development of Fig. 6 and the intersection of the spiral 77 and 63 will be in the second fifth of the scale 54. In this manner the scale 52 will be a vernier scale for the exact indication of the larger unit as indicated in the scale 54. The operator will, therefore, read the last figures of the depth indicated on the scale 52 and the first figures on the scale 54.

Figure 10:
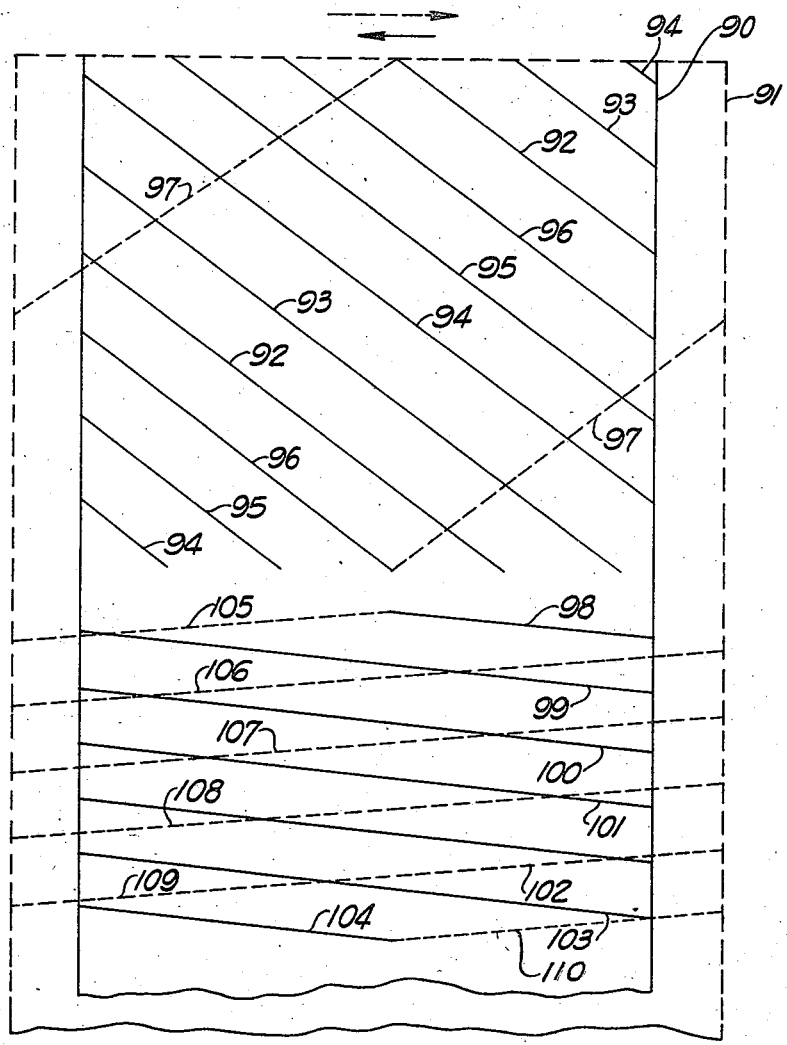
Fig. 10 shows a modification of a further development similar to that shown in Figs. 6 and 8 combined.

A somewhat different arrangement than that described above is indicated in Fig. 10. Here the full-line diagram 90 shows the development of the cylinder 1 and the dotted-line diagram 91 shows the development of the cylinder 2. In this figure the family of lines 92, 93, 94, 95 and 96 corresponds to the family parallel with the lines 71 of Fig. 6, and the broken lines 97 correspond to the lines 60 and 61 of Fig. 8. The spirals form the basis for the vernier scale indications. The coarse scale in this case, however, is arranged below the vernier scale and shows in the development of two spirals the spiral of six turns on the smaller cylinder corresponding to the full lines 98, 99, 100, 101, 102, 103 and 104, and the spiral of five turns on the larger cylinder corresponding to the broken lines 105, 106, 107, 108, 109 and 110. The intersection of the spirals, producing the flashing indicator the desired indication will therefore travel five times down the top scale while another intersection corresponding thereto will travel the length of the lower scale.

Figure 11:
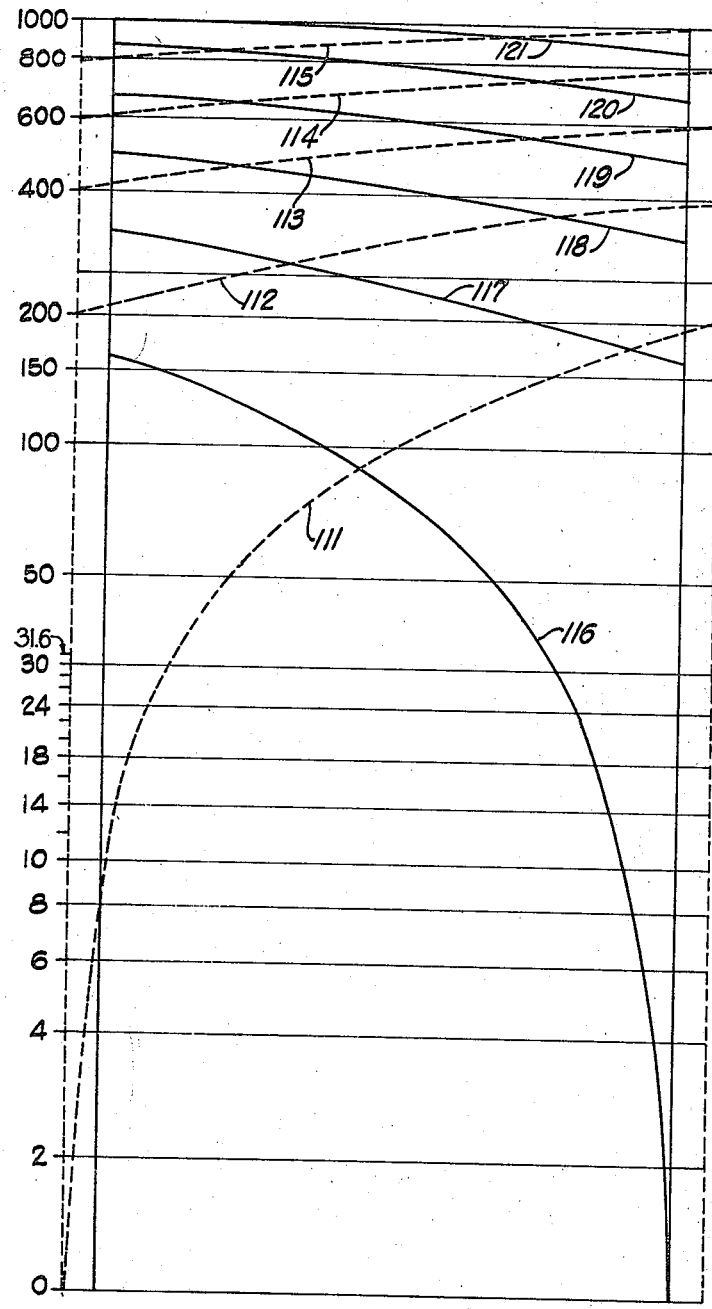
Fig. 11 shows a further modification of a development somewhat different from that indicated in Fig. 10.

Other types of scales may be used according to the particular purpose to which they may be applied. In Fig. 11 there is shown a logarithmic scale in which the dotted logarithmic curves 111, 112, 113, 114 and 115 belong to the slower and larger cylinder, having five wraps for a complete travel of the spiral with respect to the scale. The curves corresponding to the smaller cylinder will have logarithmic spirals corresponding to the lines 116, 117, 118, 119, 120 and 121, making six wraps on the cylinder for the complete scale. This type of scale because of its nature differs from the scales in the other figures in that the scale is enlarged at the beginning and decreased towards the end in accordance with the exponential function to which the scale and spiral curves are plotted. In this case, however, one complete measuring cycle will comprise five revolutions of the larger scale and six revolutions of the smaller scale with no repetition as in the previous illustrations. On the other hand, the indication will travel comparatively rapidly during the first part of the scale gradually diminishing in velocity to the end of the scale. By this means shorter distances will be read more accurately where greater accuracy is required. The logarithmic curves may be of a simple nature as for instance $Y=e^x-1$. In the scale of Figure 11 the point 31.6 is half the scale or $\sqrt{1000}$.

The invention has been described in connection with spiral convolutions having five and six revolutions. However, any desired combination may be used and should be chosen in accordance with the velocity of the signal in the propagating medium, the accuracy of readings required and the approximate range of the apparatus. In the present invention is will be noted that while the cylinders 1 and 2 rotate at different velocities, the velocity need not be changed from its originally designated value for the purpose of producing accurate short distance readings and long distance readings as well.

Further arrangements and combinations of types of scales, spirals and variations in speeds of the indicating cylinders are readily suggested by the description set forth in this specification.

Figure 9:
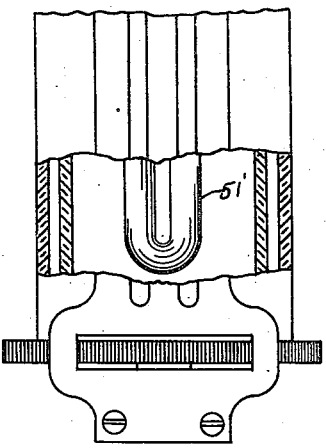
Fig. 9 shows a modification in fragmentary section of a portion of the arrangement shown in Fig. 1.
Figure 4:
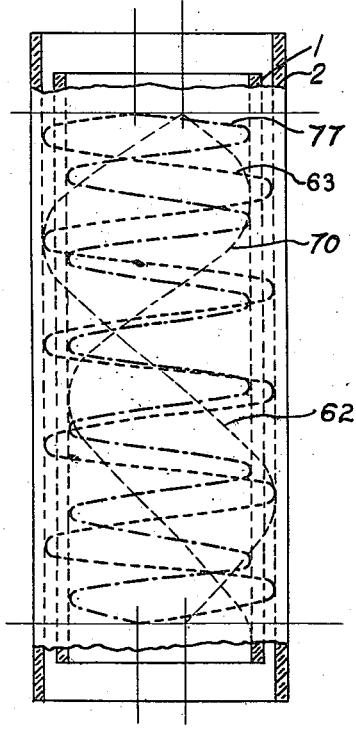
Fig. 4 shows a detail with fragmentary sections applied to elements of Fig. 1.
Figure 3:
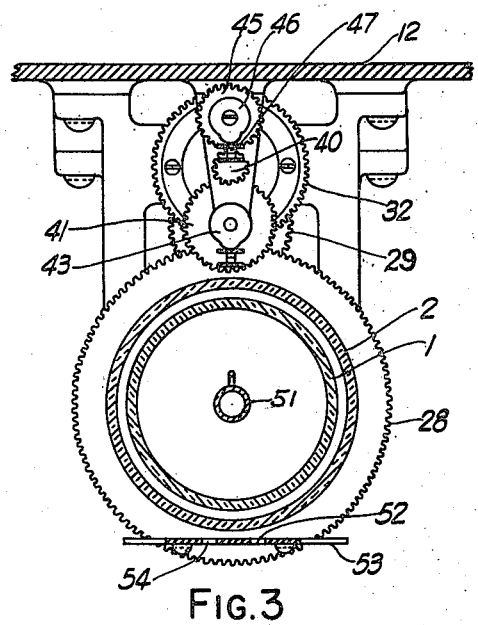
Fig. 3 is a section taken on the line 3—3 of Fig. 1.

In the arrangement of Fig. 9, the same general construction is employed as in Fig. 2 with the exception that the indicator is in the form of a bent tube 51'.

Having now described my invention, I claim:

1. In a device for measuring time intervals, an indicating device including a pair of concentric cylinders, means for rotating the same in opposite directions at different speeds having a fixed ratio to one another, one of said concentric cylinders having a spiral curving in one direction and the other of said cylinders rotating at the faster speed having a family of spirals curving in the opposite direction with a shorter pitch than the spiral on the first cylinder, said single spiral and said family of spirals providing in successive revolutions of the slower cylinder single intersections aligned along an axial element of the cylinder, said intersections forming windows permitting illumination to show through, an illuminating indicator positioned in line with said axial element and means for providing an illumination of said indicator at the end of the time interval being measured.

2. A device for measuring the time duration of recurrent phenomena comprising two rotatable concentric cylinders having groups of curves spiralling in opposite directions, said curves being chosen in such a manner and said concentric cylinders having such related speeds that the spirals intersect upon lines parallel to the axis of the cylinders, one group of intersections forming an elongated scale and another group forming an abbreviated scale whereby the first serves as a vernier for the second, means for rotating said cylinders in opposite directions, and means providing an indication at the end of the time interval being measured for producing an indication of the locus of the intersection of said spirals.

3. In a system for measuring time intervals the combination of two concentric cylinders, one having means forming a translucent spiral curve spiraling in one direction around the cylinder in a given pitch and the other having a family of translucent spiral curves spiraling in the opposite direction in a pitch different from the pitch of the first spiral, means for rotating said cylinders in opposite directions at velocities such as to maintain the intersection of said spirals on different cylinders along a chosen line parallel to an element of said cylinders, and means operatively associated with the rotation of said cylinders for periodically initiating the beginning of the time interval to be measured when a point on the spiral of the first-named cylinder intersects a given point on one of the family of spirals on the second-mentioned cylinder, means forming a mask about the line of intersection, and means for indicating momentarily the point of intersection of said spirals at the end of each time interval.

4. In a system for measuring time intervals the combination of two concentric cylinders, the first having two independent translucent spiral curves spiraling thereabout in the same direction at different pitches, one spiral curve making substantially more convolutions than the other spiral curve, the second cylinder having a family of translucent spiral curves coiled about it all of the same pitch and a second translucent spiral curve coiled about it in the same direction as, but making substantially more convolutions than the family of spiraling curves, the ratio of the pitches of the first spiraling curve of the first cylinder to that of the family of spirals of the second cylinder being the same as the ratio of the pitches of the second spiraling curve of the first cylinder to that of the second spiraling curve of the second cylinder, means for driving said cylinders in opposite directions in angular velocities corresponding to the ratio of the pitches whereby the intersection of corresponding spirals on the cylinders travel along a line parallel to an element of the cylinder, the intersection of the family of spirals on the second cylinder with the first-mentioned single spiral on the first cylinder providing a long scale measurement and the intersection of the other individual spirals on each cylinder furnishing a short scale measurement whereby two different scale measurements may be obtained without varying the speeds of the cylinders.

5. In a system of the type described, an indicator comprising two concentric cylinders having opaque surfaces with each surface being provided with translucent spiraling curves cooperating together to produce translucent intersections permitting visual indications to be given, the ratio of pitches of the spirals on one cylinder to the cooperating spirals on the other cylinder being the same, means for driving said cylinders in opposite directions at angular velocities corresponding to said ratios whereby the intersections of the cooperating spirals occur in lines parallel with an element of the cylinder, one of said lines providing the short measurement scale and the other providing the long measurement scale.

6. In a measuring system of the type described, an indicator comprising two concentric cylinders having opaque surfaces with each surface being provided with translucent spiraling curves cooperating together to produce translucent intersections permitting visual indications to be given, the ratio of pitches of the spirals on one cylinder to the cooperating spirals on the other cylinder being the same, means for driving said cylinders in opposite directions at angular velocities corresponding to said ratios whereby the intersections of the cooperating spirals occur in a line parallel with an element of the cylinder, one of such lines providing a short measurement scale and the other providing a long measurement scale, and means operatively associated with the rotation of said cylinders for initiating the beginning of a measurement periodically when a point of the cooperating spirals intersect in a new repeated cycle in said line.

7. A device for measuring the time duration of recurrent phenomena comprising two rotatable concentric cylinders having logarithmic curves spiraling in opposite directions thereabout, said curves providing by their intersection an indicating element which, upon rotation of said cylinders in opposite directions at properly related speeds, travels axially with respect to said cylinders along a predetermined line, means for rotating said cylinders at such properly related speeds, means for masking said cylinders except for said predetermined line, means adapted to be operated at the termination of the phenomena being timed for producing an indication of said intersection, and means synchronized with the rotation of said cylinders for initiating said phenomena.

8. A device for measuring the time duration of recurrent phenomena comprising two rotatable concentric cylinders having logarithmic curves spiralling in opposite directions thereabout, said curves providing groups of intersections adapted to progress axially with respect to said cylinders when said cylinders are rotated in opposite directions at properly related speeds, means for rotating said cylinders in the aforementioned manner and a window provided in a fixed position parallel to the axis of the cylinders, said spiralling curves being of such character and so positioned and said cylinders being rotated at such speeds that in successive revolutions of one of said cylinders different spiral intersections travel along said window, a series of said intersections constituting, in a number of revolutions of said one cylinder, a complete cycle in which the scale length becomes a function of the number of revolutions forming said complete cycle.

9. A device for measuring the time duration of recurrent phenomena comprising two rotatable concentric cylinders, means for rotating said cylinders in opposite directions, one of said cylinders being provided with a spiral having a convolution of a single turn and the other of said cylinders having a family of similar spirals of a convolution comprising a turn and a simple fraction thereof, each spiral of the family lagging the next by the same angle, said cylinders also having each one other spiral in the same relation of convolutions as that of the spiral having a single turn and the spiral constituting a single turn and a fraction thereof, means for rotating said cylinders in opposite directions at chosen speeds whereby in successive revolutions said first mentioned spiral of single turns will intersect along the same line with the family of spirals having a turn and a fraction thereof and whereby said other last mentioned pair of spirals will intersect along a given line an indication as to which of the intersections is being made between the first mentioned spiral and the family of spirals having one and a fractional turn, and means adapted to be operated at the end of a time interval being measured for producing a visual indication of the locus of the intersection of said spirals.

BERTRAM M. HARRISON.

REFERENCES CITED

The following references are of record in the file of this patent:

UNITED STATES PATENTS

| Number | Name | Date |
|---|---|---|
| 2,243,343 | Johnson | May 27, 1941 |
| 2,098,287 | Gent | Nov. 9, 1937 |
| 2,054,109 | Williams | Sept 15, 1936 |
| 1,528,772 | Kaminski | Mar. 10, 1925 |
| 729,164 | Haskins | May 26, 1903 |